United States Patent
Singh et al.

(10) Patent No.: US 10,400,074 B2
(45) Date of Patent: Sep. 3, 2019

(54) PROCESS FOR THE PREPARATION OF CARBON FIBER-CARBON NANOTUBES REINFORCED HYBRID POLYMER COMPOSITES FOR HIGH STRENGTH STRUCTURAL APPLICATIONS

(71) Applicant: COUNCIL OF SCIENTIFIC AND INDUSTRIAL RESEARCH, New Delhi (IN)

(72) Inventors: Bhanu Pratap Singh, New Delhi (IN); Satish Teotia, New Delhi (IN); Sanjay Rangnath Dhakate, New Delhi (IN)

(*) Notice: Subject to any disclaimer, the term of this patent is extended or adjusted under 35 U.S.C. 154(b) by 8 days.

(21) Appl. No.: 15/792,831

(22) Filed: Oct. 25, 2017

(65) Prior Publication Data
US 2018/0112046 A1 Apr. 26, 2018

(30) Foreign Application Priority Data
Oct. 25, 2016 (IN) .............. 201611036488

(51) Int. Cl.
| | | |
|---|---|---|
| C08J 5/00 | (2006.01) | |
| C01B 32/158 | (2017.01) | |
| B29C 70/08 | (2006.01) | |
| B29C 70/46 | (2006.01) | |
| C08J 5/04 | (2006.01) | |
| C08J 5/06 | (2006.01) | |
| D06M 10/02 | (2006.01) | |
| D06M 13/525 | (2006.01) | |
| D06M 13/53 | (2006.01) | |
| D06M 13/535 | (2006.01) | |
| D06M 15/55 | (2006.01) | |
| B82Y 30/00 | (2011.01) | |
| D06M 101/40 | (2006.01) | |

(52) U.S. Cl.
CPC ............ C08J 5/005 (2013.01); B29C 70/081 (2013.01); B29C 70/46 (2013.01); C01B 32/158 (2017.08); C08J 5/042 (2013.01); C08J 5/06 (2013.01); D06M 10/02 (2013.01); D06M 13/525 (2013.01); D06M 13/53 (2013.01); D06M 13/535 (2013.01); D06M 15/55 (2013.01); B82Y 30/00 (2013.01); C01B 2202/02 (2013.01); C01B 2202/06 (2013.01); C08J 2363/00 (2013.01); D06M 2101/40 (2013.01)

(58) Field of Classification Search
CPC ... C08J 5/005; C08J 5/0542; C08J 5/06; C08J 2363/00; B29C 70/081; B29C 70/46; B82Y 30/00; B82Y 40/00; D06M 10/02; D06M 13/525; D06M 13/53; D06M 13/535; D06M 15/55; D06M 2101/40; C01B 32/158; C01B 2202/02; C01B 2202/06
USPC ....................................... 524/424
See application file for complete search history.

(56) References Cited

U.S. PATENT DOCUMENTS

2013/0043033 A1 2/2013 Salazar et al.
2014/0356613 A1 12/2014 Weisenberger et al.

OTHER PUBLICATIONS

Inam et al., ("Multiscale Hybrid Micro-Nanocomposites Based on Carbon Nanotubes and Carbon Fibers", 2010, J. Nanomaterials, pp. 1-12.) (Year: 2010).*
Wang et al., "Investigation on Some Matrix-Dominated Properties of Hybrid Multiscale Composites Based on Carbon Fiber/Carbon Nanotube Modified Epoxy", Journal of Applied Polymer Science, 2013, © 2012 Wiley Periodicals, Inc., pp. 990-996.
Thostenson et al., "Carbon Nanotube/Carbon Fiber Hybrid Multiscale Composites", May 1, 2002, volimn 91, No. 9, © 2002 American Institute of Physics, pp. 6034-6037.
Inam et al., "Multiscale Hybrid Micro-Nanocomposites Based on Carbon Nanotubes and Carbon Fibers", 2010, Journal of Nanomateriels, © Hindawi Publising Corporation, pp. 1-12.

* cited by examiner

*Primary Examiner* — Ronald Grinsted

(57) ABSTRACT

The present invention relates to the development of carbon fiber carbon nanotubes reinforced polymer composites for high strength structural applications. It is very difficult to incorporate higher amount of carbon fiber >60 vol % in any of the polymer matrix. Beyond this loading the mechanical properties of these composite starts deteriorate. Therefore, further improvement in the mechanical properties is not possible. Herein, a novel method is developed to fabricate the hybrid carbon fiber epoxy composites reinforced with multiwalled carbon nanotubes. The flexural strength of the hybrid composites (~45 vol % CF+CNT) was achieved more than 600 MPa which is more than 35% over pure carbon fiber/epoxy composites (~50 vol % CF). These high strength hybrid composites can be used in wind mill blades, turbine blades, sport industries, automobile and airframe.

8 Claims, No Drawings

PROCESS FOR THE PREPARATION OF CARBON FIBER-CARBON NANOTUBES REINFORCED HYBRID POLYMER COMPOSITES FOR HIGH STRENGTH STRUCTURAL APPLICATIONS

FIELD OF THE INVENTION

The present invention relates to a process for the preparation of carbon fiber-carbon nanotubes reinforced hybrid polymer composites for high strength structural applications. In particular, the present invention relates to a novel process of making hybrid carbon nanotubes-carbon fiber-epoxy composites which involves sandwiching CNT paper between the carbon fiber layers. Till date, it is near to impossible to incorporate high amounts of carbon fiber [>60 vol %] in any of the polymer matrix; beyond which the mechanical properties of the composites starts deteriorating. The present invention thus intends to develop a process for the fabrication of hybrid carbon fiber epoxy composites reinforced with multiwalled carbon nanotubes [~45 vol % CF+CNT] exhibiting flexural strength of more than 600 MPa, which is more than 35% over pure carbon fiber/epoxy composites having ~50 vol % CF as the only component. The developed high strength hybrid composites can be used in various structural applications in automobile, defence and space, airframe, wind mill blades, sports industries and the like.

BACKGROUND OF THE INVENTION AND DESCRIPTION OF PRIOR ART

With potential applications ranging from field-emission displays and molecular electronics to nanocomposites, carbon nanotubes (CNTs) offer remarkable prospect in the development of multi-functional material systems. Reinforcement of carbon nanotubes (CNT) into a polymer matrix can improve several properties including electrical, mechanical, thermal, thermo-mechanical, chemical and optical properties. Exceptionally high mechanical properties such as strength, modulus, and resilience of the carbon nanotubes have fascinated consideration for the development of super strong light weight structures. However, the actual use of nanotubes in composites for structural applications has been disappointing despite huge promise, because of issues such as interfacial strength, alignment and dispersion. Several researchers have covered different aspects of CNT reinforcement in various polymer matrix systems. It has been observed that the use of CNT only as reinforcement at times failed to attain the superior mechanical properties in the composites. The combination of carbon fiber with carbon nanotubes, the modification in reinforcement scale relative to carbon fibers provides opportunity to unite potential benefits of nanoscale reinforcement with well-established fibrous composites to form multiscale hybrid micro/nanocomposites. By changing the reinforcement scale, it may be possible to modify the physical and mechanical properties of the composites. Hence, different routes have been adopted, remarkably a combination of carbon fiber (CF) and CNT that involves dispersion of CNT into polymer matrix (viz epoxy) followed by impregnation in carbon fabric. Nevertheless, the above compositions had the constriction of reinforcing <1% CNT and further it raised the viscosity of the CNT-epoxy mixer so much that it was hard to impregnate the entire fabric.

Reference may be made to US patent application no. 2014/0356613 wherein proposed is a method for making a carbon nanotube studded carbon fiber tow and matrix prepreg. The inventor applied silicon containing material to a tow of carbon fibers for the growth of carbon nanotube by chemical vapor deposition. In this process, the carbon fiber was unwound from spool & fed over an idler roller where silicon containing material was applied on the surface of carbon fiber tow. Silicon-based coating on surfaces of the carbon fibers supports carbon nanotube growth. Hydrocarbon organometallic compound are used as carbon source and transition metal are used as catalyst. From the matrix bath, matrix material (epoxy) was applied on the carbon nanotube studded carbon fiber tow with the help of roller and taken up on the take-up reel. Then carbon nanotube studded tow was sandwiched between an upper and lower, pre-filmed-matrix filmed on discharge patron material. In this way, the sandwich is directed through nip rollers to heat and compress the matrix film(s) into the sandwiched carbon nanotube studded tow. In conclusion, this is moved up on a round and hollow center as the prepreg material. However, the drawbacks of this patent application are that applying the silicon containing material, growth of carbon nanotube on each tow and laminating the tow by matrix consumes a lot of time and increases the cost of the process.

Reference may be made to US2013/043033 which recites that the prepreg; composite laminated component can be prepared by dispersing nanoparticles (carbon nanotubes or carbon nanofibers or nanographite) in inorganic solvent. This solution was sprayed on the support or substrate and solvent was removed by evaporation. The impregnation of resin into nanoparticle based Non-woven fabric with or without substrate was done by three methods. In the first method, resin was mixed in solvent and infiltrated into NNFW by dip-prepragging. Second by infiltration of the resin film into NNFW by roller lamination and in the third method infiltration of dilute resin into NNFW was done by curtain coating and/or roller lamination. However, the above proposed method of preparation of composite material is very tedious having numerous steps and consumes a lot of time.

Generally, two basic techniques have been followed until now for making hybrid composites First technique includes the dispersion of carbon nanotubes in epoxy matrix and utilization of this CNT dispersed epoxy as a matrix for the development of carbon nanotube-carbon fiber epoxy hybrid composites. Second involves the growth of carbon nanotubes on carbon fiber and their utilization as hybrid reinforcement for the development of carbon nanotube carbon fiber epoxy hybrid composites. However, none of the prior art documents disclose the preparation of hybrid composites by sandwiching CNT paper between the carbon fiber fabric.

Reference may be made to Thostenson et al. Journal of Applied Physics. 2002, Carbon nanotube/carbon fiber hybrid multiscale composites, volume 91, number 9 which recites the growth of carbon nanotubes directly on carbon fibers using chemical vapor deposition (CVD) and states that the selective reinforcement by nanotubes at the fiber/matrix interface likely results in local stiffening of the polymer matrix near the fabric/matrix interface, thereby improving load transfer. However, in the cited article, the CNTs were grown on carbon fiber using CVD which is a very complex process. Further, only the mechanical properties of CNT grown individual fiber were measured.

Reference may be made to Wang Baichen et al. 2012, Journal of applied Polymer Science, Investigation on some matrix-dominated properties of hybrid multiscale composites based on carbon/carbon nanotube modified epoxy, published online 27 Jun. 2012; pages 990-996, which discloses that carbon fiber reinforced epoxy composites modified with carbon nanotubes were fabricated to evaluate the effects of CNTs on hybrid multiscale composites. The study mainly focused on characterization of the state of dispersion of CNTs, analysis of the impregnation of continuous fiber reinforcement with CNTs/epoxy dispersion and assessment of shear properties of the resulting hybrid composites. However, the cited study is related to the dispersion of CNTs in epoxy resin and their use as matrix for the development of hybrid composites which is entirely different than the preparation of hybrid composites by sandwiching CNT paper between the carbon fiber layers as done in the present invention. Further, this paper used carboxylic acid functionalized multiwalled CNTs. Functionalization of CNT is not cost effective and increase the cost of the product. In addition, in this paper the carbon fiber plain fabrics were just immersed into a solution consisting of epoxy/curing agent/CNTs, whereas in the instant invention, the MWCNT paper was prepared and sandwiched into carbon fiber fabric which is a novel technique.

Reference may be made to Fawad Inam et al. 2010, Journal of Nanomaterials, Multiscale hybrid micro-nanocomposites based on carbon nanotubes and carbon fibers. Volume 2010 (2010); Article ID 453420, 12 pages which recites amino modified double walled carbon nanotube/carbon fiber/epoxy hybrid micro-nanocomposite laminates prepared by a resin infusion technique. The addition of small amounts of CNTs to epoxy resins for the fabrication of multiscale carbon fiber composites resulted in maximum enhancement in flexural modulus. Although this document relates to the dispersion of CNTs in epoxy matrix followed by vacuum impregnation of carbon fiber fabric by this CNT disperse epoxy for the development of multiscale composites, there is no sandwiching of CNT papers in this process. It is simply the impregnation of carbon fiber fabric with CNT dispersed epoxy. Further, the authors of this cited paper used amine modified double walled CNTs. The processing of amine CNT is very complex.

Thus, in short it may be summarized that till date, the composites are prepared either by dispersing CNTs in epoxy resin and their use as matrix or by growing CNT on carbon fiber and their use as hybrid reinforcement for the development of hybrid composites. However, none of the prior arts disclose a process for making hybrid composites in which CNT papers are sandwiched in between the carbon fiber fabric layers alternatively.

A major problem associated with the carbon fiber laminate reinforced polymer composites is the delamination, which is due to the ply-by-ply nature of carbon fabric reinforced resin composites. Susceptibility to delamination along interlaminar planes is an intrinsic and severe problem in the 2D polymer composites. The delamination substantially reduces the load carrying capacity and durability of composites and has led to disastrous structural failure. Thus, there is a need to improve the interlaminar shear strength which will be very much helpful for further improvement in the mechanical properties of the carbon fiber based polymer composites.

Accordingly, keeping in view the drawbacks of the hitherto reported prior art, the inventors of the present invention realized that there exists a dire need to provide a process to fabricate light weight, high strength carbon fiber, carbon nanotubes reinforced hybrid composites that enables a higher CNT-CF loading in the reinforced hybrid composite and that involves reinforcing MWCNTs in the form of papers by sandwiching them between the carbon fiber fabric layer.

OBJECTIVES OF THE INVENTION

The main objective of the present invention is thus to provide a process for the preparation of carbon nanotubes (CNT) and carbon fiber (CF) reinforced hybrid epoxy composite useful for structural applications which obviates the drawbacks of the hitherto reported prior art.

Another objective of the present invention is to provide a process for the preparation of high loading CNT in CF epoxy composite wherein a lightweight, high strength composite is fabricated that enables a higher CNT-CF loading in the epoxy.

Still another objective of the present invention is to provide a process for the preparation of CNT-CF reinforced epoxy composites which involves sandwiching free standing CNT based paper in the carbon fiber fabric layers.

Yet another objective of the present invention is to develop a CNT-CF epoxy composite which has a high strength that can be used in structural applications such as automobile, defence and space, airframe, wind mill blades and the like.

SUMMARY OF THE INVENTION

The present invention relates to the development of carbon fiber carbon nanotubes reinforced hybrid polymer composites useful for high strength structural applications. It is very difficult to incorporate high amounts of carbon fiber [>60 vol %] in the polymer matrix by conventional techniques. Beyond this loading the mechanical properties of these composites starts deteriorating. Therefore, making further improvement in the mechanical properties is impossible. For further improvement in the mechanical properties, the present invention provides a novel process to fabricate hybrid carbon fiber epoxy composites reinforced with multiwalled carbon nanotubes. The multiwalled carbon nanotubes are reinforced in the form of papers by sandwiching them between the carbon fiber fabric layers.

Accordingly, the present invention provides a process for the preparation of hybrid carbon nanotube, carbon fiber reinforced epoxy composites comprising sandwiching free standing CNT based paper in the carbon fiber fabric layers.

In an embodiment, the present invention provides novel lightweight, high strength hybrid composite material comprising Carbon Nanotubes (CNT)-Carbon Fiber (CF) and epoxy by volume ranges from 45% to 50% and exhibiting density in the range of 1.3 to 1.55 g/cc and flexural strength ranging from 474 to 720 MPa.

In another embodiment, the present invention provides light weight CNT-CF reinforced epoxy composite that are useful for multifarious structural applications in automobile, defence and space, construction of airframe and wind mill blades, sports industries and the like.

In yet another embodiment, the present invention provides a process for the preparation of carbon fiber carbon nanotubes reinforced polymer composites wherein the steps comprising:

a) mixing 0.1 to 0.5% of MWCNTs having diameter in the range of 20 to 100 nm and length in the range of 20 to 200 microns with 45 to 55 g of epoxy polymer pre heated at a temperature ranging from 40 to 60 degree C. and homogenizing for 5 to 30 min to obtain a mixture;

b) adding hardener @ 23% by weight of epoxy to the mixture obtained in step [a] followed by stirring for 2 to 10 min using a magnetic stirrer;

c) cutting six layers of Carbon fiber cloth (CF) of dimension 14 cm×17 cm each from the carbon fiber cloth sheet;

d) dispersing MWCNTs having diameter in the range of 20 to 100 nm and length in the range of 20 to 200 microns in a solvent with the help of high energy homogenizer for 10 to 15 min;

e) sonicating the MWCNTs obtained in step [d] for a period of 20 to 40 min and again homogenizing for 5 to 10 min to obtain homogenized MWCNTs;

f) fabricating five MWCNT papers having dimension of 20 cm×20 cm using the homogenized MWCNTs obtained in step [e] by vacuum filtration;

g) cutting the MWCNT papers obtained in step [f] having dimension of 14 cm×17 cm length;

h) applying the mixture obtained in step [b] on both sides of all layers of CF as obtained in step [c] and MWCNT papers as obtained in step [g] and stacking them alternately and sandwiched between the die steel plates followed by pressing at 100 to 150 kg/cm² first at a temperature ranging from 70 to 90 degree C. for a period of 1.5 to 2.5 h and then at a temperature ranging from 140 to 160 degree C. for a period of 3.5 to 4.5 h followed by cooling at room temperature to obtain the desired carbon fiber carbon nanotubes reinforced polymer composites.

In still another embodiment of the present invention, the polymer is selected from thermoplastic resin or thermosetting resin.

In yet another embodiment of the present invention, the thermoplastic resin is selected from the group consisting of polystyrene, polycarbonate, polyurethane, acrylics, polymethyl methacrylate, and polyvinylchloride.

In yet another embodiment of the present invention, the thermosetting resin is selected from the group consisting of epoxy resins, phenol-formaldehyde resins or polyesters.

In still another embodiment of the present invention, the solvent is selected from the group consisting of water, toluene, acetone, chloroform, N-methyl pyrollidone or ethanol or combination thereof.

In yet another embodiment of the present invention, the CNTs are selected from multi-walled carbon nanotubes (MWCNTs), single-walled carbon nanotubes (SWCNTs), functionalized SWCNTs/MWCNTs or combination thereof.

In still another embodiment of the present invention, the CNTs are selected from CVD (Chemical Vapor Deposition) based, arc discharged based or HiPCo (High Pressure Carbon Monoxide) based CNTs.

In yet another embodiment of the present invention, filtration is carried out using filtration unit.

In still another embodiment of the present invention, the filtration unit comprises top coupler, filter paper, metallic sieve, bottom tank, silicon sheet, Nut & bolt, silicon O-ring, vacuum port and rotary pump.

In yet another embodiment of the present invention, the density of the obtained composite is in the range of 1.3 to 1.55 g/cc and flexural strength is in the range of 474 to 720 MPa.

DETAILED DESCRIPTION OF THE INVENTION

The present invention relates to a process for the preparation of carbon fiber-carbon nanotubes reinforced hybrid polymer composites useful for high strength structural applications. The developed CNT-CF reinforced hybrid epoxy composite containing up to 50 vol % CNT-CF is a light weight, high strength material exhibiting density in the range of 1.3 to 1.55 g/cc and flexural strength in the range of 474 to 720 MPa. The sandwiching of layers of multi-walled carbon nanotube papers between the carbon fiber fabric as done in the present invention improves the interlaminar shear strength which is very much helpful for further improvement in the mechanical properties of the developed carbon fiber based polymer composites.

MWCNTs having diameter in the range of 20 to 100 nm and length in the range of 20 to 200 microns were mixed with pre heated epoxy polymer and homogenized to obtain a mixture. Hardener @ 23% by weight of epoxy was added to the mixture thus obtained followed by stirring using a magnetic stirrer. Six layers of Carbon fiber cloth (CF) of dimension 14 cm×17 cm each were cut from the carbon fiber cloth sheet. MWCNTs having diameter in the range of 20 to 100 nm and length in the range of 20 to 200 microns were dispersed in a suitable solvent with the help of high energy homogenizer followed by sonication and again homogenization to obtain homogenized MWCNTs. MWCNT papers having dimension of 20 cm×20 cm were fabricated using the homogenized MWCNTs by vacuum filtration and cut into dimension of 14 cm×17 cm length. The mixture of MWCNTs and epoxy obtained above was applied on both sides of all layers of CF and MWCNT papers followed by stacking them alternately and sandwiching between the die steel plates followed by pressing under heat. The composite thus obtained was cooled at room temperature to obtain the desired carbon fiber carbon nanotubes reinforced hybrid polymer composites having high mechanical strength.

In an aspect of the present invention, 55 g epoxy was heated at 60° C. on magnetic stirrer for 10 min and 0.2% MWCNTs were mixed with it using high energy Homogenizer for 10 min. 23% hardener was added in the heated epoxy and continued stirring for 10 min. 6 layers of CF cloth of dimension 14 cm×17 cm were cut from the carbon cloth sheet. 3.75 g MWCNTs were mixed in 1.5 L acetone with the help of high energy Homogenizer for 10 min. followed by sonication for 30 min. and again homogenized for 10 min. from which 5 no of MWCNT flexible papers of dimension 20 cm×20 cm were prepared by vacuum filtration technique. These MWCNT flexible papers were cut into dimension 14 cm×17 cm. The mixture of epoxy and hardener was applied by glass rod on both sides of all layers of CF and MWCNT flexible paper. All CF layers and MWCNT papers were stacked alternately and sandwiched between die steel plates. These die steel plates were pressed @ 100-150 kg/cm² in the hydraulic press with heater at 80° C. for 2 h followed by 150° C. for 4 h then cooled at room temperature. Samples were cut according to the ASTM D 790 from the cured CF epoxy composite plate. The three point bending strength was studied according to the ASTM D 790 by using Instron universal testing machine model 5967.

In another aspect of the present invention, to make the CF-CNTepoxy-CNT papers composite, 0.2% (w/w) MWCNTs (20-100 nm in diameter and 20-200 microns in length) were added in 55 g epoxy pre heated at 40-60° C., and homogenized for 5-15 min. 23% (w/w) hardener was added in mixture of MWCNTs and epoxy then stirred for 2-10 min by using magnetic stirrer. Six layers of Carbon fiber cloth (CF) were cut from the carbon fiber cloth sheet. The dimension of each cut sheet was 14 cm×17 cm. The mixture of MWCNT, epoxy and hardener was applied by the glass rod on both sides of all layers of CF. All layers of CF were stacked and sandwiched between die steel plates. These die steel plates were pressed at 100 kg/cm' in the hydraulic press (with heater) at 70-90° C. for 1.5-2.5 h and 140-160° C. for 3.5-4.5 h and then cooled at room temperature. Samples were cut according to the ASTM D 790 from the cured CF-CNT epoxy composite plate. The three point bending strength was studied according to the ASTM D 790 by using Instron universal testing machine model 5967.

In another aspect of the present invention, in order to improve the mechanical strength property of the developed composite, 23% (w/w) hardener was added into 50 g epoxy preheated at 60° C., and stirred for 10-30 min. Again 6 layers of Carbon fiber cloth (CF) were cut from the carbon fiber cloth sheet of dimension 14 cm×17 cm each. MWCNTs (20-100 nm in diameter and 20-200 microns in length) were dispersed into a suitable solvent (water, acetone, toluene, NMP, DMF, ethanol or combinations thereof) with the help of high energy Homogenizer for 10-30 min. After the homogenization, sonication was done for 10-30 min and again homogenized for 10-30 min. Then 5 no of MWCNT papers of dimension 20 cm×20 cm were prepared by vacuum filtration technique. These MWCNT papers were cut into dimensions measuring 14 cm wide and 17 cm in length. The mixture of epoxy and hardener was applied by the glass rod on both sides of all layers of CF and MWCNT paper as well. All layers of CF and MWCNT papers were stacked alternately and sandwiched between die steel plates. These die steel plates were pressed (100-150 kg/cm$^2$) in the hydraulic press (with heater) at 80° C. for 2 h and 150° C. for 4 h and allowed to cool down at room temperature. Samples were cut according to the ASTM D 790 from the cured CF-epoxy composite plate. The three point bending strength was studied according to the ASTM D 790 by using Instron universal testing machine model 5967.

The density, CNT-CF content and three points bending testing of the prepared composites were measured. Three points bending testing was measured by Instron universal testing machine model 5967. The sample size for three-points bending testing was taken according to the ASTM D 790.

EXAMPLES

The following examples are given by way of illustration only and therefore should not be construed to limit the scope of the present invention in any manner.

Example 1

45 g epoxy was heated at 60° C. on magnetic stirrer for 10 min and 0.1% MWCNTs were mixed with it using high energy Homogenizer for 10 min. 23% hardener was added in the heated epoxy mixture and continued stirring for 10 min. This homogeneous mixture was poured into a rectangular die. The die was placed into heating oven at 80° C. for 2 h followed by 160° C. for 4 h and then cooled at room temperature to obtain the desired composite. Samples were removed from the die. The three point bending strength was measured using Instron universal testing machine model 4411.

Example 2

45 g epoxy was heated at 60° C. on magnetic stirrer for 15 min and 0.2% MWCNTs were mixed with it using high energy Homogenizer for 10 min. Then 23% hardener was added in the heated epoxy mixture and continued the stirring for 10 min. This homogeneous mixture was poured into a rectangular die. The die was placed into heating oven at 85° C. for 2 h followed by 150° C. for 4 h and then cooled at room temperature to obtain the desired composite. Samples were removed from the die. The three point bending strength was measured using Instron universal testing machine model 4411.

Example 3

45 g epoxy was heated at 60° C. on magnetic stirrer for 20 min and 0.3% MWCNTs were mixed with it using high energy Homogenizer for 20 min. 23% hardener was added in the heated epoxy mixture and continued the stirring for 10 min. This homogeneous mixture was poured into a rectangular die. The die was placed into heating oven at 90° C. for 2 h followed by 145° C. for 4 h and then cooled at room temperature to obtain the desired composite. Samples were removed from the die. The three point bending strength was measured using Instron universal testing machine model 4411.

Example 4

45 g epoxy was heated at 60° C. on magnetic stirrer for 10 min and 0.5% MWCNTs were mixed with it using high energy Homogenizer for 30 min. 23% hardener was added in the heated epoxy mixture and continued the stirring for 10 min. This homogeneous mixture was poured into a rectangular die. The die was placed into heating oven at 75° C. for 2 h followed by 160° C. for 4 h and then cooled at room temperature to obtain the desired composite. Samples were removed from the die. The three point bending strength was measured using Instron universal testing machine model 4411.

Example 5

45 g epoxy was heated at 60° C. on magnetic stirrer for 10 min. 23% hardener was added in the heated epoxy and continued stirring for 10 min. 6 layers of carbon fiber (CF) cloth of dimension 14 cm×17 cm were cut from the carbon cloth sheet. The mixture of epoxy and hardener was applied by glass rod on both sides of all layers of CF. All CF layers were stacked and sandwiched between die steel plates. These die steel plates were pressed (100 kg/cm$^2$) in the hydraulic press (with heater) at 80° C. for 2 h and 150° C. for 4 h then cool at room temperature. Samples were cut according to the ASTM D 790 from the cured CF epoxy composite plate. The three point bending strength was studied by using Instron universal testing machine model 5967.

Examples 6

50 g epoxy was heated at 60° C. on magnetic stirrer for 10 min. 23% hardener was added in the heated epoxy and continued stirring for 10 min. 6 layers of CF cloth of dimension 14 cm×17 cm were cut from the carbon cloth sheet. 3.75 g MWCNTs were mixed in 1.5 L acetone with the help of high energy Homogenizer for 10 min. followed by sonication for 30 min. and again homogenized for 10 min. from which 5 no of MWCNT flexible papers of dimension 20 cm×20 cm were prepared by vacuum filtration technique. These MWCNT flexible papers were cut into dimension 14 cm×17 cm. The mixture of epoxy and hardener was applied by glass rod on both sides of all layers of CF and MWCNT flexible paper. All CF layers and MWCNT papers were stacked alternately and sandwiched between die steel plates. These die steel plates were pressed @ 10-100 kg/cm$^2$ in the hydraulic press with heater at 80° C. for 2 h followed by 150° C. for 4 h then cooled at room temperature. Samples were cut according to the ASTM D 790 from the cured CF epoxy composite plate. The three point bending strength was studied according to the ASTM D 790 by using Instron universal testing machine model 5967.

Example 7

55 g epoxy was heated at 60° C. on magnetic stirrer for 10 min and 0.2% MWCNTs were mixed with it using high energy Homogenizer for 10 min. 23% hardener was added in the heated epoxy and continued stirring for 10 min. 6 layers of CF cloth of dimension 14 cm×17 cm were cut from the carbon cloth sheet. 3.75 g MWCNTs were mixed in 1.5 L acetone with the help of high energy Homogenizer for 10 min. followed by sonication for 30 min. and again homogenized for 10 min. from which 5 no of MWCNT flexible papers of dimension 20 cm×20 cm were prepared by vacuum filtration technique. These MWCNT flexible papers were cut into dimension 14 cm×17 cm. The mixture of epoxy and hardener was applied by glass rod on both sides of all layers of CF and MWCNT flexible paper. All CF layers and MWCNT papers were stacked alternately and sandwiched between die steel plates. These die steel plates were pressed @ 10-100 kg/cm$^2$ in the hydraulic press with heater at 80° C. for 2 h followed by 150° C. for 4 h then cooled at room temperature. Samples were cut according to the ASTM D 790 from the cured CF epoxy composite plate. The three point bending strength was studied according to the ASTM D 790 by using Instron universal testing machine model 5967.

Example 8

55 g epoxy was heated at 60° C. on magnetic stirrer for 10 min and 0.2% MWCNTs were mixed with it using high energy Homogenizer for 10 min. 23% hardener was added in the heated epoxy and continued the stirring for 10 min. 6 layers of CF of dimension 14 cm×17 cm were cut from the carbon cloth sheet. The mixture of epoxy and hardener was applied by glass rod on both sides of all layers of CF. All CF layers were stacked and sandwiched between die steel plates. These die steel plates were pressed (100 kg/cm$^2$) in the hydraulic press (with heater) at 80° C. for 2 h and 150° C. for 4 h then cool at room temperature. Samples were cut according to the ASTM D 790 from the cured CF epoxy composite plate. The three point bending strength was studied according to the ASTM D 790 by using Instron universal testing machine model 5967.

Example 9

55 g epoxy was heated at 60° C. on magnetic stirrer for 10 min and 0.3% MWCNTs were mixed with it using high energy Homogenizer for 20 min. 23% hardener was added in the heated epoxy and continued stirring for 10 min. 6 layers of CF of dimension 14 cm×17 cm were cut from the carbon cloth sheet. The mixture of epoxy and hardener was applied by glass rod on both sides of all layers of CF. All CF layers were stacked and sandwiched between die steel plates. These die steel plates were pressed (100 kg/cm$^2$) in the hydraulic press (with heater) at 80° C. for 2 h and 150° C. for 4 h then cool at room temperature. Samples were cut according to the ASTM D 790 from the cured CF epoxy composite plate. The three point bending strength was studied according to the ASTM D 790 by using Instron universal testing machine model 5967.

TABLE 1

Results obtained in examples 1 to 9

| Example No | Reinforcement Type | Wt. % of MWCNTs in epoxy | Type of samples | Carbon Fiber Layers (No.) | MWCNT paper Layers (No.) | Flexural strength (MPa) |
|---|---|---|---|---|---|---|
| 1 | MWCNTs | 0.1 | MWCNTs-epoxy composites | 0 | 0 | 104-114 |
| 2 | MWCNTs | 0.2 | MWCNTs-epoxy composites | 0 | 0 | 107-119 |
| 3 | MWCNTs | 0.3 | MWCNTs-epoxy composites | 0 | 0 | 100-107 |
| 4 | MWCNTs | 0.5 | MWCNTs-epoxy composites | 0 | 0 | 82-93 |
| 5 | Carbon Fiber Cloth | — | CF-epoxy composites | 6 | 0 | 444-496 |
| 6 | Carbon Fiber Cloth and MWCNTs Papers | — | CF-MWCNTs Papers epoxy composites | 6 | 5 | 552-635 |
| 7 | Carbon Fiber Cloth, MWCNTs Papers and MWCNTs | 0.2 | CF-MWCNTs Papers-MWCNTs dispersed epoxy composites | 6 | 5 | 587-720 |
| 8 | Carbon Fiber Cloth and MWCNTs | 0.2 | CF-MWCNTs dispersed epoxy composites | 6 | 0 | 582-670 |
| 9 | Carbon Fiber Cloth and MWCNTs | 0.3 | CF-MWCNTs dispersed epoxy composites | 6 | 0 | 441-570 |

ADVANTAGES OF THE INVENTION

The present invention identifies the improvement of carbon fiber-carbon nanotubes strengthened polymer composites for high quality structural applications.

These composites can be utilized as a part of structural applications in car, defense and space, airframe, wind mills, sports factory and so forth.

The present invention demonstrates the procedure to develop the composites unlike the customary methods of dispersion, for example, surfactant-helped systems, arrangement blending, in situ polymerization, in-situ development of MWCNTs on the carbon fiber and melt-mixing strategies.

The developed hybrid composites (~45 vol % CF+CNT) have flexural strength of more than 600 MPa.

The developed composites have more than 35% bending strength (~45 vol % CF+CNT) over pure carbon fiber-epoxy composites (~50 vol % CF). A higher content of carbon fiber increase the strength of composite.

The utilization of a novel system not just gives a higher quality of the composites; furthermore the impregnated MWCNT paper is very adaptable and can be formed into different shapes before curing relying upon the application.

The composite is consumption safe and light weight with a density of 1.3-1.55 g/cc.

The composite arranged by this strategy is a mass isotropic composites and containing just CF, MWCNT and polymer. No other fixing has been included other than solvents.

The system is straightforward and includes few simple processing steps.

The invention claimed is:

1. A process for the preparation of carbon fiber carbon nanotubes (CNTs) reinforced polymer composites wherein the steps comprising:
   a) mixing 0.1 to 0.5% (w/w) of multi walled carbon nanotubes (MWCNTs) having a diameter in the range of 20 to 100 nm and a length in the range of 20 to 200 microns with 45 to 55 g of epoxy polymer pre heated at a temperature ranging from 40 to 60 degree C. and homogenizing for 5 to 30 min to obtain a mixture;
   b) adding a hardener at 23% by weight of epoxy to the mixture obtained in step [a] followed by stirring for 2 to 10 min using a magnetic stirrer;
   c) cutting six layers of Carbon fiber cloth (CF) of dimension 14 cm×17 cm each from a carbon fiber cloth sheet;
   d) dispersing the MWCNTs having the diameter in the range of 20 to 100 nm and the length in the range of 20 to 200 microns in a solvent with a high energy homogenizer for 10 to 15 min;
   e) sonicating the MWCNTs obtained in step [d] for a period of 20 to 40 min and again homogenizing for 5 to 10 min to obtain homogenized MWCNTs;
   f) fabricating five MWCNT papers having a dimension of 20 cm×20 cm using the homogenized MWCNTs obtained in step [e] by vacuum filtration;
   g) cutting the MWCNT papers obtained in step [f] to a dimension of 14 cm×17 cm length; and
   h) applying the mixture obtained in step [b] on both sides of the six layers of the CF as obtained in step [c] and the MWCNT papers as obtained in step [g] and stacking them alternately and sandwiched between die steel plates, followed by pressing at 100 to 150 kg/cm$^2$ first at a temperature ranging from 70 to 90 degree C. for a period of 1.5 to 2.5 h and then at a temperature ranging from 140 to 160 degree C. for a period of 3.5 to 4.5 h, followed by cooling at room temperature to obtain the desired CNTs reinforced polymer composites.

2. The process as claimed in claim 1, wherein the epoxy polymer is selected from a thermosetting resin.

3. The process as claimed in claim 2, wherein the thermosetting resin is epoxy resins or polyesters.

4. The process as claimed in claim 1, wherein the CNTs are MWCNTs.

5. The process as claimed in claim 1, wherein the CNTs are selected from the group consisting of arc discharged based and chemical vapor deposition (CVD) based CNTs.

6. The process as claimed in claim 1, wherein the vacuum filtration is carried out using a vacuum filtration unit comprising a top, filter paper/nylon cloth, metallic sieve, bottom tank, silicon sheet, nut and bolt, silicon O-ring, vacuum port and rotary pump.

7. The process as claimed in claim 1, wherein the pressing is done using a hydraulic press with heater.

8. The process as claimed in claim 1, wherein the solvent is selected from the group consisting of water, chloroform, toluene, N-methyl pyrolidone, ethanol, acetone and combinations thereof.

* * * * *